United States Patent
Lanzatella et al.

(10) Patent No.: US 7,117,505 B2
(45) Date of Patent: Oct. 3, 2006

(54) METHODS, SYSTEMS, AND APPARATUS TO INTERFACE WITH STORAGE OBJECTS

(75) Inventors: Thomas W. Lanzatella, Minneapolis, MN (US); Graham Bromley, Dublin, CA (US); John O. Colgrove, Los Altos, CA (US); Ron Karr, Palo Alto, CA (US); Blaine T. Cuykendall, San Jose, CA (US); Oleg Kiselev, Palo Alto, CA (US); Craig Harmer, San Francisco, CA (US); Allen Unueco, Bellevue, WA (US); Steven Micheal Umbehocker, Mercer Island, WA (US)

(73) Assignee: Veritas Operating Corporation, Mountain View, CA (US)

( * ) Notice: Subject to any disclaimer, the term of this patent is extended or adjusted under 35 U.S.C. 154(b) by 679 days.

(21) Appl. No.: 09/997,612

(22) Filed: Nov. 29, 2001

(65) Prior Publication Data

US 2003/0101173 A1    May 29, 2003

(51) Int. Cl.
G06F 9/00 (2006.01)
G06F 17/30 (2006.01)
(52) U.S. Cl. .......................................... 719/328; 707/6
(58) Field of Classification Search ................ 719/328, 719/310; 707/100, 6
See application file for complete search history.

(56) References Cited

U.S. PATENT DOCUMENTS

| | | | |
|---|---|---|---|
| 5,471,615 A * | 11/1995 | Amatsu et al. ............. 709/202 |
| 5,668,958 A * | 9/1997 | Bendert et al. ............. 710/305 |
| 5,991,542 A * | 11/1999 | Han et al. ................... 395/712 |
| 6,018,743 A * | 1/2000 | Xu .......................... 707/103 R |
| 6,029,168 A * | 2/2000 | Frey ............................ 707/10 |
| 6,253,324 B1 * | 6/2001 | Field et al. .................. 713/187 |
| 6,282,602 B1 * | 8/2001 | Blumenau et al. ............. 711/4 |
| 6,329,985 B1 * | 12/2001 | Tamer et al. ............... 715/853 |
| 6,385,706 B1 * | 5/2002 | Ofek et al. .................. 711/162 |
| 6,542,909 B1 * | 4/2003 | Tamer et al. ............... 707/205 |
| 6,564,219 B1 * | 5/2003 | Lee et al. ................... 707/100 |
| 6,854,123 B1 * | 2/2005 | Lewallen .................... 719/328 |

OTHER PUBLICATIONS

"Storage Area Networking—High-Speed Data Sharing Among Multiple Computer Platforms", *Tivoli Systems, Inc., Copyright 2000*, http://www.tivoli.com/products/documents/whitepapers/san_datasharing_wp.pdf, (2000),4 pages.*

"Storage Management—Best Practices", *Copyright 2001, IBM Corp.*, http://www.tivoli.com/products/documents/whitepapers/wp-storage-bp.pdf,(2001),11 pages.*

(Continued)

*Primary Examiner*—William Thomson
*Assistant Examiner*—LeChi Truong
(74) *Attorney, Agent, or Firm*—Meyertons Hood Kivlin Kowert & Goetzel, P.C.; B. Noël Kivlin (57) ABSTRACT

Methods, systems, and apparatus to interface with storage objects are provided. A storage object handle is provided on request and a storage object is mapped within a first storage environment. Further, a configuration identifier notifies client modules when the storage object's physical locations are altered in the first storage environment. API libraries provide client modules access to use the storage object, even when the client modules reside in a second storage environment.

17 Claims, 4 Drawing Sheets

OTHER PUBLICATIONS

Amiri, Khalil.S. ,"Scalabale and manageable storage systems", *Ph.D. Thesis, Dept. of Electrical and Computer Engineering, Carnegie Mellon University*, Pittsburgh, PA, http://www.pdl.cmu.edu/PDL-FTP/NASD/amiri_thesis.pdf,(Dec. 2000),i-241.*

Wylie, Jay.J. ,et al. ,"Selecting the Right Data Distribution Scheme for a Survivable Storage System", *Research Paper, School of Computer Science, Carnegie Mellon University*, Pittsburgh, PA, http://www.pdl.cmu.edu/PDL-FTP/Storage/CMU-CS-01-120.pdf,(May 2001),pp. 1-21.*

* cited by examiner

METHODS, SYSTEMS, AND APPARATUS TO INTERFACE WITH STORAGE OBJECTS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright © 2001, VERITAS Software Company, All Rights Reserved.

FIELD OF THE INVENTION

The present invention is related to interfacing with storage objects, and more particularly to methods, systems, and apparatus providing interfaces to storage objects.

BACKGROUND INFORMATION

Storage networking is the practice of connecting storage devices to computing devices (e.g., clients, servers, and the like) by using Fibre Channel networks instead of traditional point-to-point small computer system interface (SCSI) channels. A network used to connect servers to storage devices is referred to as a storage area network (SAN). Within a SAN environment, all computing devices have access to the available storage devices. This presents a wide variety of benefits, including server platform fail-over wherein a failed storage device is automatically recovered by another operational server platform without requiring any recabling of the storage devices themselves. As will be apparent to those skilled in the art, connectivity among the computing devices and the underlying storage devices within the SAN environment is shared.

Prior to the development of SAN technology, local and wide area networks provided connectivity between computing devices that did not include storage devices. Connections were established with network protocols such as Transmission Communication Protocol (TCP), Unreliable Datagram Protocol (UDP), and others. These protocols ensure that message ordering is preserved and that messages are not lost. Distributed File Systems such as network file system (NFS) and Common Internet file system (CIFS) are layered on top of network protocols. Distributed File Systems organize access to files and correspondingly data storage elements across a network consisting of heterogeneous computing devices. The computing devices are typically organized as clients and servers, in a client-server architecture. Access to files or data storage elements is transparent to any particular computing device, such that access is consistent across the distributed file system without the need to have any private information about the physical locations or details associated with any particular file or data element.

The convenience of distributed file systems comes with an expense, since every byte of data exported by a file server managing a distributed file system must pass through the file server's memory, through the communications stack, and through a network interface controller before it reaches the application. Accordingly, the low performance and low throughput of operation associated with distributed file systems prohibit the implementation of many high performance data-sharing applications such as large scale distributed database applications, backup applications and the like. SAN environments present the opportunity to alleviate this issue by elevating storage devices within the network to peers of the clients and the servers, thereby in theory providing the opportunity of improving throughput of operation.

Yet, SAN technology has not produced advances in throughput of operations as one would anticipate. This is due to the fact that shared access to data among several compute platforms must be mediated by distributed file systems. Consequently, while the speed of connections between platforms has scaled upward with the introduction of SAN, the basic method of using distributed file systems to share data has not changed. Distributed file systems are innately restricted in the level of performance that can be achieved due to the computing overhead introduced by the communication protocol. Consequently, application writers are motivated to find strategies other than distributed file system in order to share data at speeds that are consistent with SAN technology. These strategies typically employ sharing information about files and volumes with remote application components. Using this information, an application can know everything about a file without having access to the file through a distributed file system. Additionally, the application can use this information to reference data directly on the SAN-connected storage device.

For these strategies to succeed, applications need to be able to discover sufficient information about files and volumes that a component on another platform can access the data associated with the file or volume. Customarily, this type of information is not externalized by either file systems or distributed file systems. As used herein this is referred to as private information. Private information differs from one file system operating on one computing device within the SAN and another file system operating on another computing device within the SAN. Correspondingly, data storage element portability is difficult to achieve within the confines of present SAN technology.

Furthermore, the very purpose of file system and volume manager function within an operating system is to hide the private information related to data storage elements located on one or more data storage devices. Accordingly, operating system vendors, file system vendors or volume manager vendors do not reveal or provide any useful interfaces that provide access to private information. Moreover, storage environment software stacks are complex and trying to extract the private information from existing stacks is not readily achievable without intervention from the file system software or volume manager software itself.

Moreover private information about data storage elements is in a continual state of flux in modern data storage architectures, since at any moment in time data storage elements are moved during storage device failure, device reorganization to reduce fragmentation, and the like. Therefore, any ability to acquire private information must also entail notification that private data has been changed. Otherwise, the acquired private information may be stale or inaccurate.

In addition to performance bottlenecks, many disparate operating systems housing particular file systems can not seamlessly interact with one another since the private information about data storage elements remains largely unobtainable to application software programs. Therefore, when an organization migrates from one operating system, file system or volume manager to a different operating system, file system or volume manager an expensive data storage migration also ensues.

In an effort to address some of these problems some industry associations have been initiated in an attempt to standardize data storage device communication. For example, the Storage Network Industry Association (SNIA) and the National Committee for Information Technology Standards (NCITS) technical committee T11 have been established. Yet, these associations are attempting to gain voluntary standardization for storage device manufacturers to adhere to when developing storage devices, and therefore the work of these associations will not assist with existing storage devices, existing operating systems, existing file systems or existing volume managers. Accordingly, the success of these associations is limited in scope and has yet to be demonstrated even with newly released products and services.

Additionally, even with persistent and stable representations of data storage elements, workable and useable application programming interfaces (APIs) will need to be established, such that different levels of abstraction and interfacing to the storage elements can be achieved seamlessly with user-defined software applications. In this way, user-defined software applications can utilize the APIs to better interact with the storage objects. Moreover, the user-defined software applications will often reside in storage environments different from the storage elements, therefore any provided API must be capable of operating in both storage environments.

Therefore, what is needed is methods, systems and apparatus for providing interfaces to flexible representations of data storage elements, thereby improving data storage element interactions across storage networks and permitting more seamless data migration between disparate computing or storage environments.

SUMMARY OF THE INVENTION

According to one aspect of the present invention, a method providing an interface to a storage object is provided, wherein an identifier for the storage object is acquired. Further, a map for the storage object is requested and a configuration identifier associated with the map is established. Moreover, the identifier, the map, and the configuration identifier are used with one or more accesses made to the storage object.

According to another aspect of the present invention, an application programming interface library (API) is provided. The API includes an establish map module operable to generate a persistent data structure of a storage object housed within a first storage environment and an assign configuration identifier module operable to associate with the persistent data structure and notify a client module when the persistent data structure is modified. Furthermore, the API includes an alternate map module activated to generate one or more alternate persistent data structures for the storage object when the storage object is replicated within the first storage environment.

According to still another aspect of the present invention, a storage object interface system is provided. The system has an API library including one or more modules operable to map the storage object within a first storage environment and provide notifications when one or more of the storage object's physical locations are altered. The system also includes a client module using one or more of the modules of the API library to interface with the storage object.

In yet another aspect of the present invention, an apparatus to interface with a storage object is provided. The apparatus includes an API providing stable access to the storage object located in a first storage environment and a client module linked to the API, wherein the client module is executed in a second storage environment. Furthermore, the client module is notified by a notification module residing within the API when one or more of the physical locations associated with the storage object change in the first storage environment.

DESCRIPTION OF THE PREFERRED EMBODIMENTS

In the following detailed description of various embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Furthermore, as used herein a computing device includes one or more processing elements coupled with computer readable memory which can be volatile or non-volatile memory or any combination thereof. Additionally, the term "object" of "storage object" as used herein includes data storage elements such as, and by way of example only electronic files, portions of data related to a single electronic file, a file system, a database, a storage device partition, and the like.

Initially in some embodiments, a logical representation of a storage object within its native storage environment is obtained before one or more APIs providing efficient access to the storage object are provided to interface with the storage object. One such logical representation in one embodiment, is achieved by mapping the storage object, within the storage environment, to the storage object's physical locations. This mapping then populates a pre-defined data structure. The data structure is manipulated as appropriate by the APIs which retain knowledge about the format and structure of the pre-defined data structure. However, any user-defined application or client module using the API need not know the format or structure of the predefined data structure.

Of course as will be readily apparent to those skilled in the art, the mapping need not be a single data structure or any data structure at all since any rules-based application, which normalizes (e.g., standardizes) the mapping of the storage object, is acceptable when the API has access to the appropriate rules to interface with the normalized mapping.

For example, in some embodiments an initial reference to a data storage object occurs within the same storage environment wherein the object physically resides or within a different storage environment which is interfaced through a network connection to the object's physical storage environment, such as a SAN. The reference triggers a pointer to the object to be opened and set initially to null. Next, a map domain request is initiated with the storage object's physical storage environment. The map domain request, in some embodiments, is implemented as a set of executable instructions operable to access low level operating system tables and executable instructions. Further, the map domain request generates a data structure which serves as a map to the physical location of the storage object.

In some embodiments, the data structure is a tree having a root node which identifies the storage object being mapped. The second level of the tree includes an identification of the file system located on the storage object's physical storage environment. A third level of the tree identifies the volume manager associated with routing references to the storage object to an appropriate disk partition or disk drive. Next, the partitions of the disk are identified within the tree. Finally one or more sub disks or disks are identified as leaf nodes of the tree, these leaves identify the exact physical storage device or devices within which the storage object being referenced physically resides.

Of course as will be readily appreciated by those skilled in the art, a tree need not be used as the data structure representing the map of the data storage object within the data storage object's physical storage environment, since any data structure now known (e.g., lists, linked lists, arrays, hash tables, heaps, binary trees, treaps, arrays, customized classes in objected oriented languages, and the like) or hereafter developed can be deployed without departing from the present invention. Furthermore, as previously presented no data structures are required at all if a rules-based normalization (e.g., standardization) process is used to generate a logical map.

Next in some embodiments, the extents of the object are resolved. An initial extent identifies the offset location within one or more storage devices where the object physically resides. Furthermore, a number of additional extents identify how many blocks or chunks of space in bytes are to be associated with the assembly of physical storage associated with the storage object. Corresponding as one skilled in the art will appreciate, having the generated data structure combined with the extents, an object is readily accessible and referenced from the referencing storage environment, even when the referencing storage environment includes a first file system which is incompatible with a second file system residing on the data storage object's physical storage environment.

In this way, in some embodiments, any user-defined application or client module becomes enabled to interface with a data storage object residing on a disparate operating system, if access to the map and information about how to retrieve nodes of the map are known to the user-defined application or client module. For example an application residing within MICROSOFT'S NT operating system can access and interface with a data storage object residing on a storage device controlled by a UNIX operating system.

Of course it is often desirable and advantageous to mask the details about the map from any user-defined application or client-module, by producing an intermediate set of interfaces referred to as an API. In this way, when the map's underlying representation is altered only a few modules within the API will need to be adjusted to account for the altered map representation, and the innumerable user-defined applications or client modules do not need modified at all, since these applications or modules do not include the details of the underlying representation of the map. In fact as one skilled in the art will appreciate, when the API is embodied as a dynamic linked library (DLL) or a shared library the user-defined application or client module will not even be required to recompile the modified API, since the appropriate modified API source code is compiled separate from the user-defined application of client module source code and dynamically linked with the user-defined application or client module during execution.

Furthermore, in some embodiments every storage object residing in a second storage environment is recursively mapped within the second storage environment as depicted. Accordingly, a complete map (e.g., data structure) of a second storage environment is created. The original referencing storage environment then receives a handle resulting in a direct communication link to each referenced object within the second storage environment by having access to the map (e.g., data structure).

Moreover in some embodiments, each storage object mapped receives a configuration identification which is used each time the referencing storage environment attempts to access the storage object. If the storage object's physical storage location is altered or modified in anyway, this identification notifies the referencing storage environment of the change and an updating map domain request is issued either automatically or manually from any referencing application residing in the referencing storage environment. Accordingly, the storage object's logical representation within the referencing storage environment is validated and/or updated as necessary. This results in an accurate view of the storage object's physical storage environment.

In other embodiments, metadata associated with the data storage object are retrieved and returned to a referencing application in the referencing storage environment. The metadata in some embodiments are returned independent from the data structure, and in other embodiments the metadata are returned with the data structure such that each node within the data structure includes metadata related to the node. In this way, valuable information regarding a disparate file system is obtainable in the referencing storage environment, such as naming conventions, data blocking factor, partitions, and the like. Further, metadata includes any non primary data (e.g., data not physically included within the data storage object's physical location) related to the storage object, such as modification date, security access level, byte size, data type (e.g., text, word processor, image, video, and the like), statistical data (e.g., number of accesses, changes made to the data, and the like) and others.

Also, in some embodiments low level executable instructions permit the operating system to communicate and provide the exact unique location of the data storage object's storage device. In some embodiments, this resolution includes a serial number of the device, in other embodiments it is an Internet Protocol (IP) address. This private information provides additional detail to the generated data structure, not normally ascertainable by a file system or operating system.

In still other embodiments, sets of executable instructions permit the virtual mounting of a foreign and remote file system onto a local file system by using the map domain and the metadata to emulate the foreign file system. In this way a WINDOW'S NT file system can mount a Unix file system.

As one skilled in the art will readily appreciate, the logical representation of the storage object, acquisition of the metadata, and the exact location of storage devices housing the storage object is best provided to a user-defined application or a client module through a set of modules comprised in an API, since this provides transparent access to the user-defined application or client module, as presented above.

Figure 1:
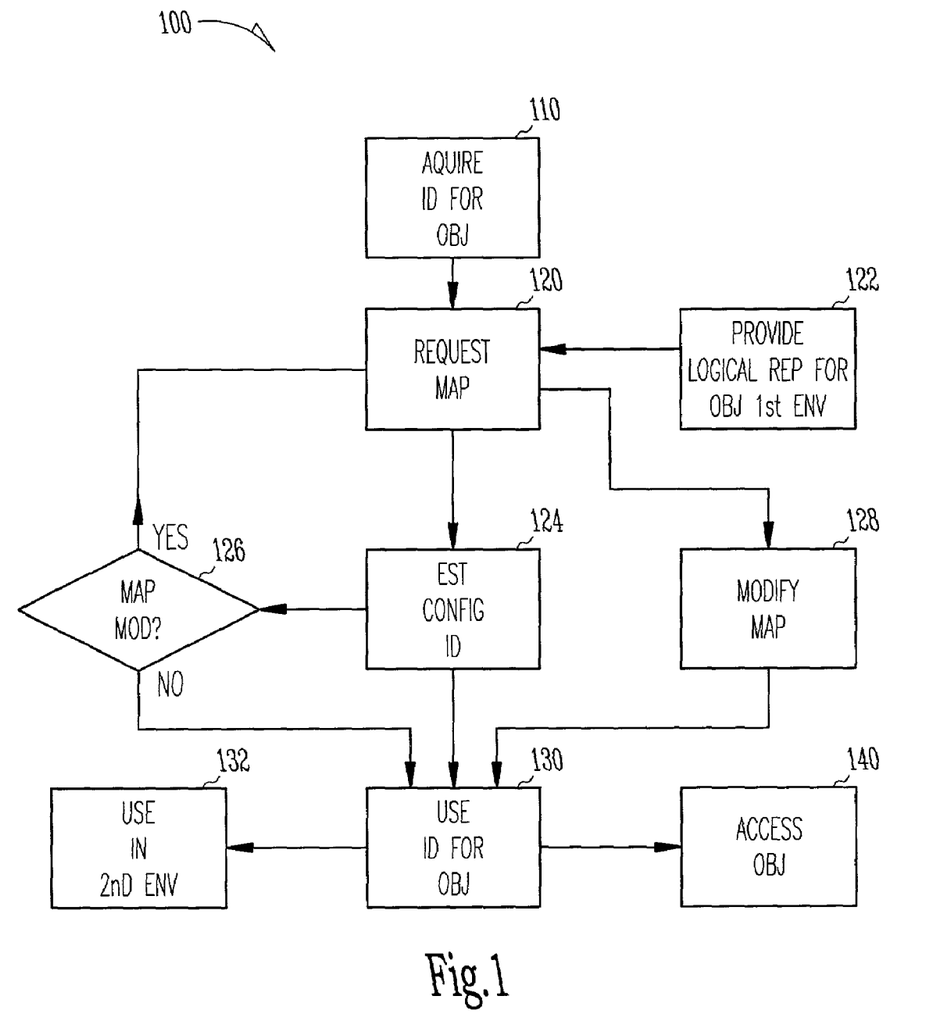
FIG. 1 shows one flowchart of a method providing an interface to a storage object according to the present invention.

FIG. 1 shows one flowchart of one method 100 providing an interface to a storage object according to the present invention. In step 110 an identifier associated with the storage object is acquired. The identifier permits an application using method 100 to create a stable and persistent reference to the storage object. The identifier is any unique representation or handle used by the using application to identify the storage object. In step 120 a map is requested for the storage object, as previously presented the map is any logical and stable representation of the storage object as it resides in the storage object's native storage environment. In some embodiments, this map is a data structure and in other embodiments the map is dynamically generated and provided logically by using a rules-based normalization (e.g., standardization) process.

Once the map is acquired a configuration identifier is established in step 124, the configuration identifier uniquely identifies and associates the storage object's identifier to the map requested in step 120. As one skilled in the art will appreciate, the configuration identifier permits any using application to receive notification should the storage object's underlying map be altered in any manner. This facilitates stable and persistent access to the storage object during a using application's accesses to the storage object.

For example in some embodiments, if after establishing the configuration identifier any subsequent accesses to the storage object will result in the map being checked to see if the map has been modified in step 126. If the map was modified, then a request for a updated map occurs again in step 120 and 128, and in step 124 a subsequent configuration identifier is established for the modified map. Establishment of the configuration identifier, in some embodiments, is the responsibility of the using application. In other embodiments, the establishment of the configuration identifier and its management is built into APIs provided to the using application at lower-levels of abstraction, such that the using application is not aware of the configuration identifier.

In step 130, the identifier, the map, and the configuration identifier are made available to a using application or an API such one or more access to the storage object are made in step 140. Moreover, in some embodiments the map represents the storage object in a first storage environment while the use of the identifier, the map, and the configuration identifier occur with an application executing on a second storage environment, as depicted in step 132.

In other embodiments, the method steps depicted as steps 110, 120, 124, and 130 are represented as modules or functions within a DLL or a shared library. The modules and functions, in still other embodiments, are packaged as an API and are available to a user-defined or client module for accessing and interfacing with the storage object.

Figure 2:
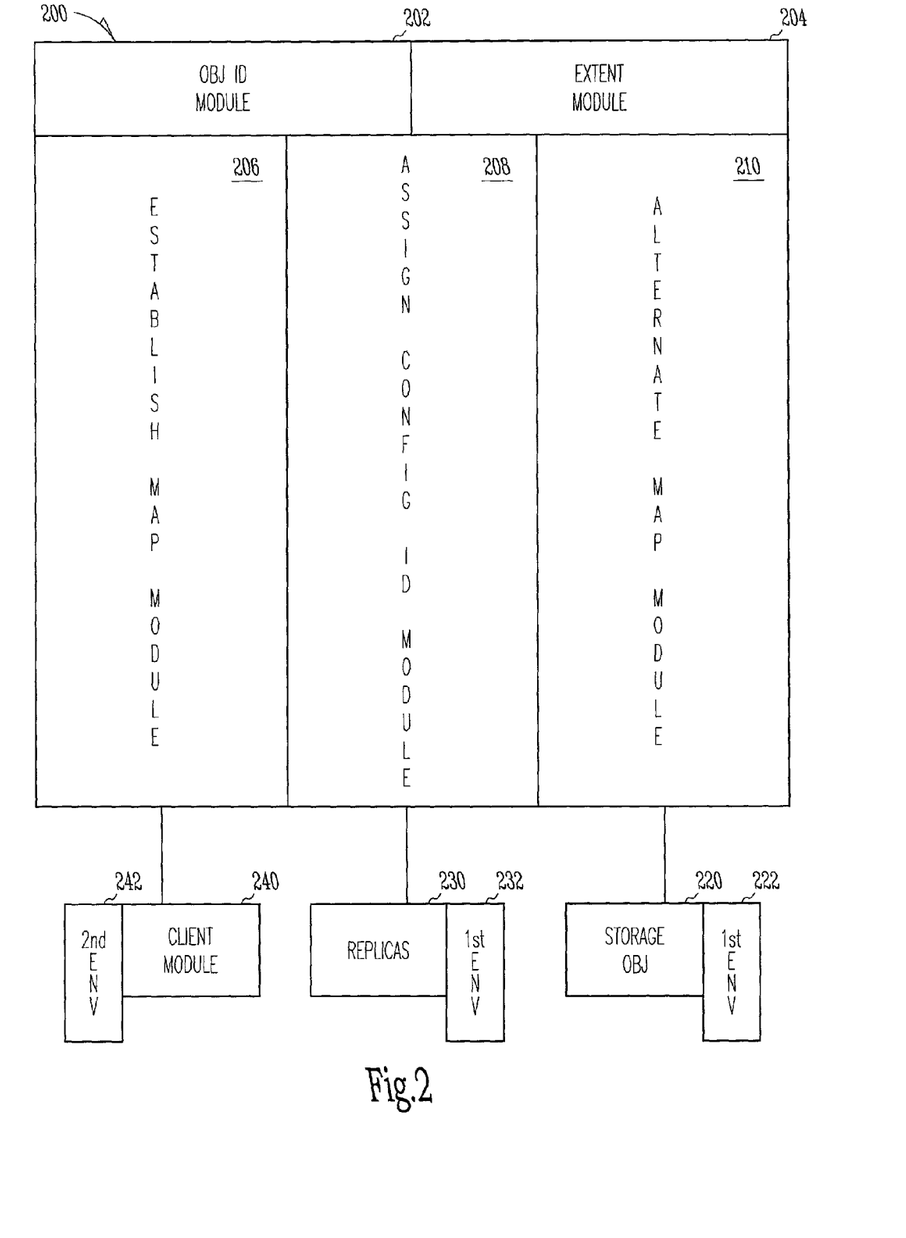
FIG. 2 shows one block diagram of an API library according to the present invention.

FIG. 2 shows one block diagram of one API library 200 according to the present invention. API library 200 includes an establish map module 206, an assign configuration identifier module 208, and an alternate map module 210. In other embodiments, the API library 200 further includes an obtain storage identifier module 202, and a retrieve extents module 204. The API library 200, in some embodiments, is provided as a DLL or a shared library, thereby permitting a client module 240 access to the API library 200, while the client module 240 resides in a second storage environment 242 which, in some embodiments, is incompatible with a first storage environment 222 wherein the storage object 222 resides. Of course, the API library 200 is operable to be executed in both the first storage environment 222 and the second storage environment 242.

Further as will be appreciated by those skilled in the art and in some embodiments, a variety of additional modules which facilitate interaction between a client module 240 and the storage object 220 are readily provided. For example, an initialize module, to acquire memory and set appropriate values for memory locations, is provided. Likewise, a shutdown module frees and releases memory upon a termination associated with the client module 240 after interaction with the storage object 220 completes. Also, in some embodiments, error notification modules provided error messages and codes to the client module 240 should some interaction or access with the storage object 220 result in an error condition.

Furthermore, query modules provide the client module 240 with access to properties or attributes associated with the storage object 220 or the underlying logical representation of the storage object 220. In this way, the client module 240 acquires upon request file system information such as directory structures, partitions, naming conventions, and the like that are associated with the storage object 220 as it resides in the first storage environment 222. Of course, properties or attributes associated with the storage object 220 directly are also readily obtained, these properties include, by way of example only, creation date, version information, security access level, size in bytes, and the like.

Additionally, in some embodiments the API library 200 is structured such that some modules are executed only by the API library's 200 own internal modules and not by the client module 240. This permits further abstraction and protection of the underlying logical data representation of the storage object 220 residing in the first storage environment 222. For example, in some embodiments, modules provide direct queries to the first environment's 222 operating system to acquire statistical information regarding the storage object 220, such as accesses made to the storage object 220, data blocks written to the storage object 220, and the like. As is readily apparent, a variety of additional modules abstracting and protecting the underlying logical data representation of the storage object 220 are readily implemented as additional modules within the API library 200 of FIG. 2, and are intended to fall within the scope of the present invention.

The establish map module 206 generates a logical representation (e.g., map) of the storage object 220 as the storage object 220 exists within the first storage environment 222. The output of the establish map module 206 is a persistent data structure of the logical representation. In some embodiments, the client module 240 directly initiates the establish map module 206 along with a storage object identifier which uniquely identifies the storage object 220 that the client module 240 desires to interact with, or otherwise access. In other embodiments, the obtain storage object identifier module 202 when first initiated by the client module 240 causes the execution of the establish map module 206.

The storage object identifier is acquired through the obtain storage object identifier module 202 which provides an association between a reference to the storage object 220 made in the second storage environment 242 and the actual storage object 220 in the first storage environment 222. As one skilled in the art will appreciate, this is achieved by resolving any naming convention conflicts for the storage object 220 within the first storage environment 242 and the second storage environment 222. The output of the obtain storage object identifier module 202, in some embodiments, is the creation of a unique identifier handle which the client module 240 can use during accesses to the storage object 220.

The client module 240 does not receive direct access to the persistent data structure generated by the establish map module 206. In this way, the client module 240 relies on internal modules, or functions of internal modules, within the API library 200 to generate and manage the appropriate linkage and interaction between the client module 240 in the second storage environment 242 and the storage object 220 in the first storage environment 222.

Moreover in some embodiments, the assign configuration identifier module 208 associates the storage object identifier and the persistent data structure with one another, such that if the underlying logical representation of the storage object 220 is modified or altered in manner, a subsequent call to the configuration identifier module 208 will result in a different configuration identifier being produced. In this way, the client module 240 can directly, by calling the assign configuration identifier module 208, ensure the persistent data structure is indeed stable and persistent with each access to the storage object 220, by providing the generated configuration identifier with each access. Alternatively in other embodiments, the configuration identifier is maintained and checked internally within the API library 200 on each attempted access by the client module 240 to the storage object 220.

As one skilled in the art will readily recognize, the stability and persistence of the data structure which represents the storage object 220 in the first storage environment should be guaranteed before the client module 240 attempts access to the storage object 220, otherwise the incorrect storage locations within the first storage environment could become corrupted on a write, and/or the client module 240 could produce unexpected results, with or without failure, since a read results in the use of incorrect storage locations. Furthermore, storage environments are dynamic with storage devices changing and being swapped out and replaced on a regular basis, there is no guarantee without a validation module, such as the assign configuration identifier module 208 of FIG. 2, that with any particular access to the storage object 220 by the client module that the persistent data structure is indeed stable and reliable. Moreover, file systems and volumes are refigured such that the persistent data structure can become unreliable.

In the event that persistent data structure has been modified, the establish map module 206, is used to generate an alternate persistent data structure transparently to the client module 240. This permits the client module 240 to continue with uninterrupted stable access to the storage object 220 even when the original persistent data structure is altered between access to the storage object 220. Again in some embodiments, the establish map module 206 is recalled by the client module 240 after the client module 240 receives a notification from the assign configuration identifier module 208 that the persistent data structure has been altered. Alternatively, the establish map module 206 is called by the assign configuration identifier module 208 when a detection in a change to the persistent data structure is noted.

Also, in some embodiments a retrieve extent module 204 is provided, wherein the extent module 204 is operable to identify the precise data locations and blocks on one or more storage devices within the first storage environment 222 that the storage object 220 occupies. In most cases, a coarse grain level of abstraction client module 240 may not require the use of the retrieve extent module 204, but a finer grain level of abstraction client module 240 may desire this information. Moreover some internal API library 200 modules, specifically the establish map module 206, in some embodiments require access and use of the retrieve extent module 204 while creating the persistent data structure. Further, in some embodiments the number of extents returned by the retrieve extent module 204 is configurable and identified as a parameter on any call made to the retrieve extent module 204. In this way, the level of abstraction becomes customizable to the module utilizing or desiring the extent information.

The alternate map module 210 is activated to generate one or more alternate persistent data structures when the storage object 220 is replicated 230 within the first storage environment 222. As will be appreciated, a single storage object 220 can be replicated 230 or otherwise mirrored within the first storage environment 222, for backup and recovery purposes, or decision support applications, and the like. Having the ability to recognize not only the persistent data structure but all the alternate persistent data structures associated with the storage object 220 allows the client module 240 to transparently access the storage object 220 and still adjust the replicas 230 associated with the storage object 220, creating stability within the first storage environment 222 for the storage object 220 when it is modified by the client module 240, which resides in the second storage environment 242.

Figure 3:
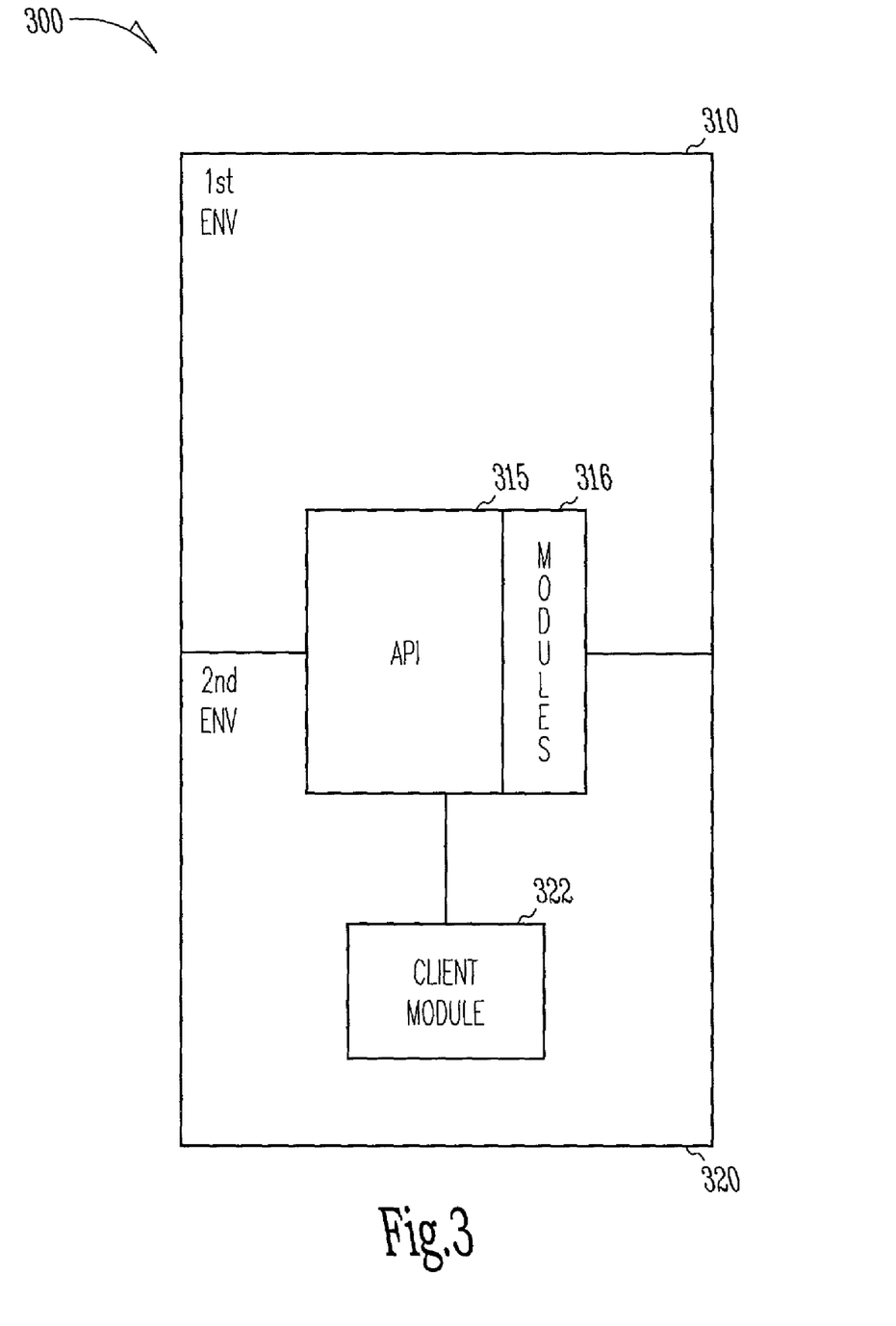
FIG. 3 shows one diagram of a storage object interface system according to the present invention.

FIG. 3 shows one diagram of one storage object interface system 300 according to the present invention. The system 300 includes an API library 315 having one or more modules 316. The one or more of the modules 316 are operable to map a storage object, within a first storage environment 310, to a stable data representation. The stable data representation represents a complete path within the first storage environment 310 and the necessary access through the path required to gain access with the storage object within the first storage environment 310. The path further includes one or more of the storage object's physical locations within the first storage environment 310. Other modules 316 provide notifications when one or more of the storage object's physical locations are altered.

The system 300 also includes a client module that uses one of more of the modules 316 of the API library 315 to interface with the storage object. As previously presented in some embodiments, the stable data representation of the storage object is transparent to the client module 322 and is generated and managed within the API library 315. In some embodiments, a storage map module generates the stable data representation and an assign configuration identifier module manages the stable data representation. Furthermore in some embodiments, an alternative map module generates multiple stable data structures when the storage object is replicated within the first storage environment 310.

In other embodiments, the API library 315 resides and executes within a second storage environment 320 as well as the first storage environment 310. Also, the client module 322 resides and executes within the second storage environment 320. In still other embodiments, the API library 315 is provided as a DLL or a shared library.

Figure 4:
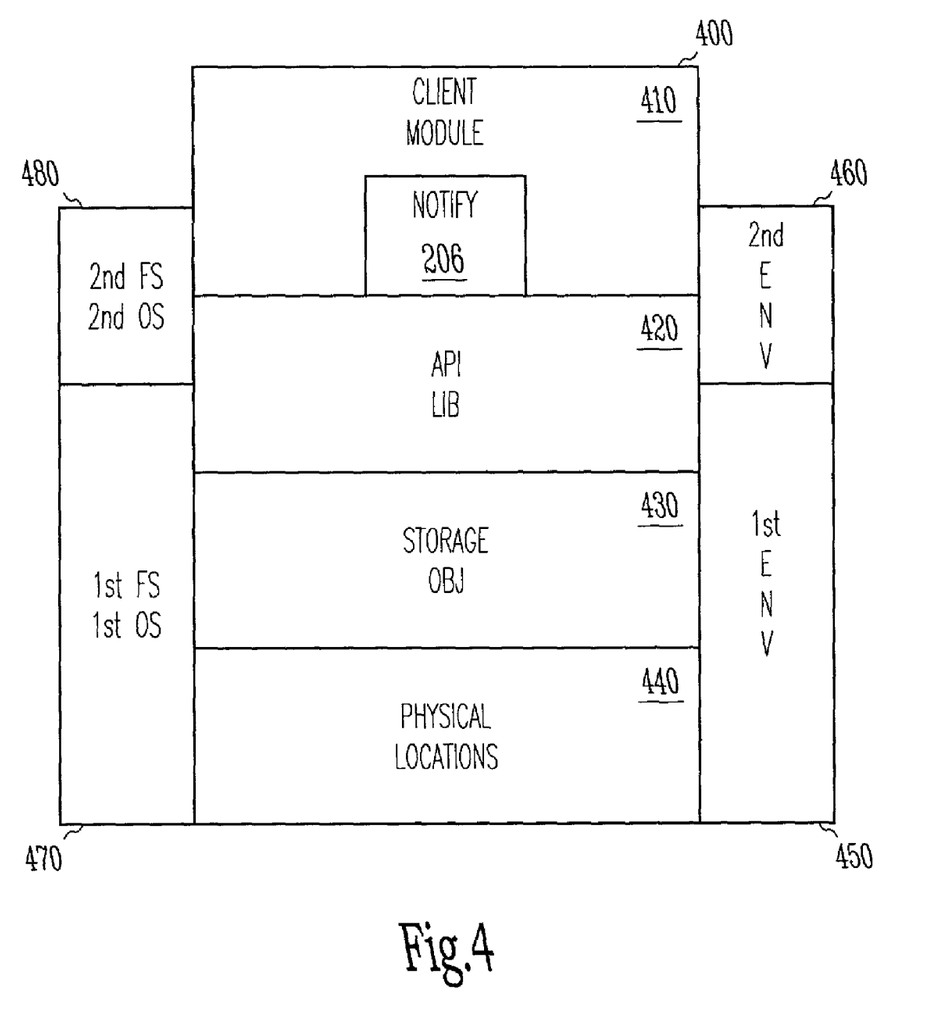
FIG. 4 shows one diagram of an apparatus used to interface with a storage object according to the teachings of the present invention.

FIG. 4 shows one diagram of one apparatus 400 used to interface with a storage object 430 according to the teachings of the present invention. The apparatus 400 includes an API library 420 that provides stable access to the storage object 430, wherein the storage object 430 resides in a first storage environment 450. Furthermore, the apparatus 400 includes a client module 410 linked to the API library 420, wherein the client module 410 is executed in a second storage environment 460. In some embodiments the API library 420 resides and executes in both the first storage environment 450 and the second storage environment 460.

As one skilled in the art will appreciate, the linking of the client module 410 to the API library 420 need not be static, since the API library 420 in some embodiments is provided and made available to the client module 410 as a dynamic library, wherein the executable instructions associated with modules of the API library 420 are acquired at an execution time of the client module 410 and not when source code associated with the client module 410 is statically compiled. Further, as one skilled in the art will appreciate if the client module 410 and/or the API library 420 are developed in interpreted programming languages, such as PERL, Java, and others, no compiles are needed at all on the source codes, since the source codes are in effect the executable instructions. In fact, all that is required for the client module 410 to be linked with the API library 420 is that the client module 410 have access to initiating one or more modules of the API library 420.

Moreover, if one or more of the physical locations 440 of the storage object 430 change within the first storage environment 450, then a notification module 415 residing within the API library 420 notifies the client module 410. In this way, ,stable and reliable access to the storage object 430 is ensured when the client module 410 attempts to access the storage object 430.

In other embodiments, the apparatus 400 is used to interface a first files system optionally residing in a first operating system 470 to a second file system optionally residing in a second operating system 480. Also, in some embodiments the first storage environment 450 resides in a first operating system 470 which is different from a second operating system 480 of the second storage environment 460. In this way, an entire file system of one storage environment which is incompatible to another file system of another storage environment can be interfaced with apparatus 400.

CONCLUSION

The methods, systems, and apparatus discussed above permits reliable and stable interfaces to a storage object. These interfaces permit customized user-defined applications to access low-level private information about the storage object, even when the storage object resides in disparate storage environments, operating systems, and uses disparate file systems. Multiple levels of abstraction in the interfaces provided with the present invention permit the user-defined applications to perform complex operations transparent to the user-defined applications by using an API of the present invention. In contrast to the past, one can now efficiently access and interface between disparate file systems, volume managers, storage environments, or computing environments. As one skilled in the art will appreciate, this is achieved with existing file systems, storage devices, and operating systems with no need for substantial revisions or adherence to any particular data communication standard.

Moreover, as will be apparent to those skilled in the art the present invention can be usefully deployed during the creation of a frozen image associated with the storage environment. In this way, data mirroring and data backup is more easily achieved with the tenets of the present invention by using the present invention to facilitate applications in creating frozen images of the storage environment.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method comprising:
generating, at a first environment, a first mapping of a storage object to physical storage at a second storage environment, wherein the first mapping indicates a first physical storage location at which at least a portion of the data of the storage object is stored, and wherein the first mapping includes a plurality of nodes of a data structure including a first node representing a file system layer at the second storage environment and a second node representing a volume manager layer at the second storage environment;
obtaining, at the first storage environment, a configuration identifier associated with the storage object, first metadata associated with the file system layer and second metadata associated with the volume manager layer;
generating, from the first storage environment, a request to access the at least a portion of the data of the storage object, wherein the request includes the configuration identifier;
in response to said request to access, receiving a notification at the first storage environment of a change of location of the at least a portion of the data if the physical storage location of the at least a portion of the data has changed;
in response to said notification, generating a new mapping at the first storage environment, wherein the new mapping indicates that the at least a portion of the data is located at a second physical storage location; and
accessing, from the first storage environment, the at least a portion of the data at the second physical storage location.

2. The method as recited in claim 1, further comprising:
obtaining, at the first storage environment, a new configuration identifier if the physical storage location of the at least a portion of the data has changed.

3. The method as recited in claim 1, wherein the second storage environment comprises a replica of the storage object, further comprising:
generating, at the first storage environment, a mapping of the replica to physical storage.

4. The method as recited in claim 1, wherein at least a portion of the data of the storage object is included within a first file system supported by a first operating system in use at the second storage environment, further comprising:
virtually mounting the first file system onto a local file system supported by a second operating system in use at the first storage environment.

5. The method as recited in claim 1, further comprising:
generating a unique handle to identify the storage object at the first storage environment, wherein said generating the unique handle comprises resolving a naming convention conflict between the first storage environment and the second storage environment.

6. The method as recited in claim 1, further comprising:
providing an application programming interface (API) library to allow access to the storage object from the first storage environment, wherein said generating the first mapping comprises invoking a first function of the API library, and wherein said obtaining the configuration identifier comprises invoking a second function of the API library.

7. A system, comprising:
a processor; and
memory coupled to the processor, wherein the memory stores instructions executable by the processor to:
provide a storage mapping application programming interface (API) library including a plurality of functions;
generate, using a first function of the plurality of functions, a first mapping of a storage object to physical storage, wherein the first mapping indicates a first physical storage location at which at least a portion of the data of the storage object is stored, and wherein the first mapping includes a plurality of nodes of a data structure including a first node representing a first storage management layer at a storage environment where the data of the storage object is stored, and a second node representing a second storage management layer at the storage environment;
obtain, using one or more functions of the plurality of functions, first metadata associated with the first storage management layer and second metadata associated with the second storage management layer;
obtain, using a second function of the plurality of functions, a configuration identifier associated with the storage object;
generate, using a third function of the plurality of functions, a request to access the at least a portion of the data of the storage object, wherein the request includes the configuration identifier;
in response to said request to access, receive a notification of a change of location of the at least a portion of the data if the physical storage location of the at least a portion of the data has changed; and
in response to said notification, generate using the first function, a new mapping at the first storage environment, wherein the new mapping indicates that the at least a portion of the data is located at a second physical storage location.

8. The system as recited in claim 7, wherein the instructions are further executable to:
obtain a new configuration identifier using a function of the plurality of functions if the physical storage location of the at least a portion of the data has changed.

9. The system as recited in claim 7, further including a replica of the storage object, wherein the instructions are further executable to:
generate, using a function of the plurality of functions, a mapping of the replica to physical storage.

10. The system as recited in claim 7, wherein at least a portion of the data of the storage object is included within a first file system supported by a first operating system, wherein the instructions are further executable to:
virtually mount the first file system onto a local file system supported by a second operating system.

11. The system as recited in claim 7, wherein the instructions are further executable to:
generate a unique handle to identify the storage object, wherein said generating the unique handle comprises resolving a naming convention conflict between a first storage environment and a second storage environment.

12. A computer readable medium comprising program instructions, wherein the instructions are computer executable to:
generate, at a first storage environment, a first mapping of a storage object to physical storage at a second storage environment, wherein the first mapping indicates a first physical storage location at which at least a portion of the data of the storage object is stored, and wherein the first mapping includes a plurality of nodes of a data structure including a first node representing a file system layer at the second storage environment and a second node representing a volume manager layer at the second storage environment;
obtain, at the first storage environment, a configuration identifier associated with the storage object obtain, first metadata associated with the file system layer and second matadata associated with the volume manager layer;
generate, from the first storage environment, a request to access the at least a portion of the data of the storage object, wherein the request includes the configuration identifier;
in response to said request to access, receive a notification at the first storage environment of a change of location of the at least a portion of the data if the physical storage location of the at least a portion of the data has changed;
in response to said notification, generate a new mapping at the first storage environment, wherein the new mapping indicates that the at least a portion of the data is located at a second physical storage location; and
access, from the first storage environment, the at least a portion of the data from the second physical storage location using the new mapping.

13. The computer readable medium as recited in claim 12, wherein the instructions are further computer executable to:
obtain, at the first storage environment, a new configuration identifier if the physical storage location of the at least a portion of the data has changed.

14. The computer readable medium as recited in claim 12, wherein the second storage environment comprises a replica of the storage object, wherein the instructions are further computer executable to:

generate, at the first storage environment, a mapping of the replica to physical storage.

15. The computer readable medium as recited in claim 12, wherein at least a portion of the data of the storage object is included within a first file system supported by a first operating system in use at the second storage environment, wherein the instructions are further computer executable to:

virtually mount the first file system onto a local file system supported by a second operating system in use at the first storage environment.

16. The computer readable medium as recited in claim 12, wherein the instruction are further computer executable to:

generate a unique handle to identify the storage object at the first storage environment, wherein said generating the unique handle comprises resolving a naming convention conflict between the first storage environment and the second storage environment.

17. The computer readable medium as recited in claim 12, wherein the instructions are further computer executable to:

provide an application programming interface (API) library to allow access to the storage object from the first storage environment, wherein said generating the first mapping comprises invoking a first function of the API library, and wherein said obtaining the configuration identifier comprises invoking a second function of the API library.

* * * * *

UNITED STATES PATENT AND TRADEMARK OFFICE
CERTIFICATE OF CORRECTION

PATENT NO. : 7,117,505 B2
APPLICATION NO. : 09/997612
DATED : October 3, 2006
INVENTOR(S) : Thomas W. Lanzatella et al.

It is certified that error appears in the above-identified patent and that said Letters Patent is hereby corrected as shown below:

Title page, item [75] please change "John O. Colgrove" to --John A. Colgrove--.

Signed and Sealed this

Twenty-sixth Day of February, 2008

JON W. DUDAS
*Director of the United States Patent and Trademark Office*